(12) United States Patent
Piccione et al.

(10) Patent No.: US 6,236,019 B1
(45) Date of Patent: May 22, 2001

(54) HEATED WINDSHIELD WIPER ASSEMBLY

(76) Inventors: Salvatore R. Piccione; Lisa M. Piccione, both of 4 Harding Ct., Easton, PA (US) 18045

( * ) Notice: Subject to any disclaimer, the term of this patent is extended or adjusted under 35 U.S.C. 154(b) by 0 days.

(21) Appl. No.: 09/397,582

(22) Filed: Sep. 16, 1999

(51) Int. Cl.$^7$ ..................................... B60L 1/02
(52) U.S. Cl. ........................ 219/203; 15/250.06
(58) Field of Search .................... 219/202, 203, 219/528, 544, 549; 15/250.05, 250.06, 250.03, 250.08, 250.09

(56) References Cited

U.S. PATENT DOCUMENTS

| | | | |
|---|---|---|---|
| 3,619,556 | * 11/1971 | Deibel | 219/203 |
| 3,639,938 | * 2/1972 | Golden | 15/250.06 |
| 3,919,734 | * 11/1975 | Mosley | 15/250.06 |
| 5,221,828 | * 6/1993 | Basheer et al. | 219/202 |
| 5,325,561 | * 7/1994 | Kotlar | 219/202 |
| 5,504,965 | * 4/1996 | Guell | 219/202 |
| 5,539,951 | * 7/1996 | Guell et al. | 219/202 |
| 5,558,792 | * 9/1996 | Gauharou | 219/202 |
| 5,572,765 | * 11/1996 | Guell | 15/250.06 |
| 5,649,337 | * 7/1997 | Lobner | 219/202 |
| 5,676,868 | * 10/1997 | Simmons | 219/202 |
| 5,749,118 | * 5/1998 | Holland | 219/202 |
| 5,826,293 | * 10/1998 | Holland | 219/202 |
| 5,832,558 | * 11/1998 | Ehret et al. | 219/202 |
| 5,979,796 | * 11/1999 | Ponziani et al. | 219/202 |

* cited by examiner

*Primary Examiner*—Teresa Walberg
*Assistant Examiner*—Fadi H. Dahbour
(74) *Attorney, Agent, or Firm*—John Lezdey & Assoc

(57) ABSTRACT

A heated windshield wiper assembly is provided which is attachable to the wiper blade carrier arm of a vehicle. The assembly has a wiper blade having an electrical heating element throughout its longitudinal length. The heating element is energized through a thermo-sensor that is activated at a selected temperature and upon oscillation of the wiper arm.

5 Claims, 1 Drawing Sheet

FIG. 1
FIG. 2
FIG. 3
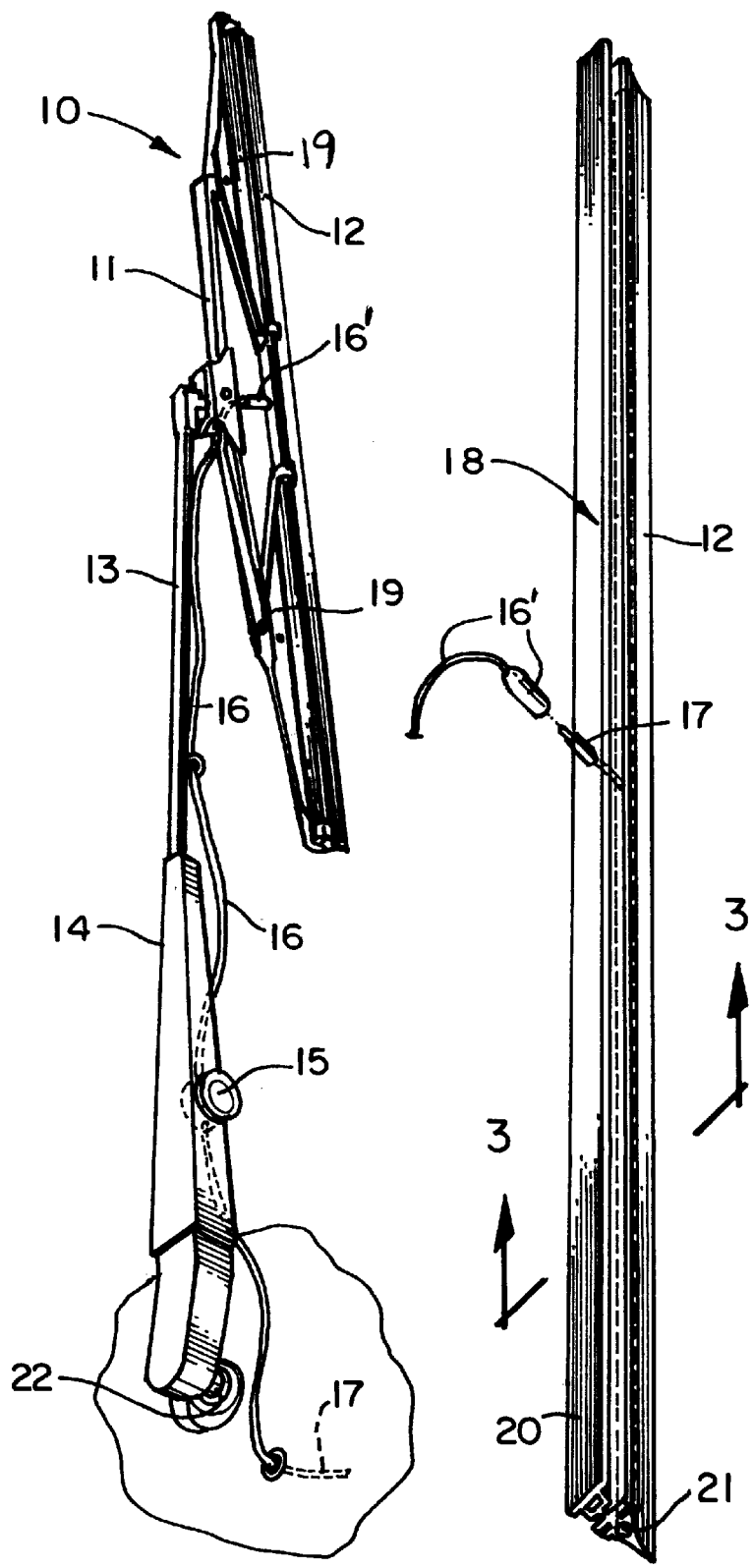
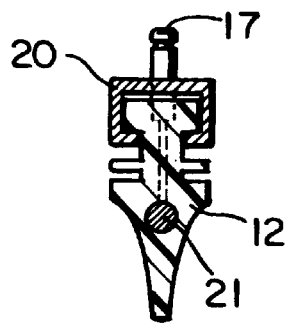

HEATED WINDSHIELD WIPER ASSEMBLY

FIELD OF THE INVENTION

The present invention relates to a heated windshield wiper blade assembly for an oscillating wiper arm. More particularly, the invention relates to a heated windshield wiper assembly for a motor vehicle or aircraft having a thermo-sensor, which automatically activates a heating unit when there is ice and/or snow.

BACKGROUND OF THE INVENTION

There is a need for preventing the buildup of ice and snow accumulation on vehicles which can impair the effectiveness of windshield wiper blades in cleaning the windshield of cold weather precipitation. Also, wintertime freeze-up and icing of windshield wiper blades causes the wiper blades to lose flexibility and not sweep the curved windshield found on most motor vehicles clear enough for good driving visibility.

U.S. Pat. No. 5,841,106 to Kohler, which is herein incorporated by reference, discloses a heated windshield wiper assembly which includes an external heating coil positioned next to the blade portion of the assembly. The heating coil's activation switch is in the interior of the vehicle and allows a user to selectively energize the external heating coil.

U.S. Pat. No. 5,603,856 discloses a windshield wiper having a shroud which encloses an electrically heated chamber which prevents ice and snow deposits on the shroud.

U.S. Pat. No. 3,532,561 which is herein incorporated by reference, discloses a vehicle windshield wiper assembly which contains a flexible heater wire disposed in and extending longitudinally throughout the body of a flexible wiper blade. A switch means is connected to a power source of the vehicle for activating the heating element is manually operated by the user.

U.S. Pat. No. 5,787,543 to Selders et al, which is herein incorporated by reference, discloses a windshield wiper blade having an internal conduit extending throughout the length through which a flexible spiral heating element is placed. The heating element is coupled to power source which is activated by the user.

In another approach, the windshield wiper frame and flexible linkages are enclosed in a heated envelope (U.S. Pat. Nos. 3,523,626 and 3,619,556). In U.S. Pat. No. 3,523,626, the envelope is filled with a heated fluid. These designs are meant to heat the frame and linkages to remove ice and snow which interfere with the movement of the frame and linkages. These heated envelopes are cumbersome and impede flexing action. In these indirect heating methods, electrical energy is used ineffectively and inefficiently in an attempt to improve the wiping action.

In summary, the foregoing prior art has not solved the problem of providing satisfactory wiping performance in frigid snowy and icy conditions while simultaneously removing and keeping the wiper blade, frame and linkages free from interference by ice and snow.

SUMMARY OF THE INVENTION

In accordance with the invention, there is provided a heated windshield wiper blade assembly for an oscillating wiper arm having at least one wiper blade carrier arm. The heated windshield wiper blade assembly comprises:

a carrier arm flange portion mounted on the blade carrier arm. The carrier arm flange portion carries a flexible wiper blade body.

The wiper blade body has an inner channel extending along its length and a heating element within the channel.

A temperature sensing means is mounted on the carrier arm and is connected to the heating element and to a means for providing energy to the heating element to heat the windshield wiper blade. The temperature sensing means is activated only at a selected temperature range and energizes the heating element.

Advantageously, the temperature sensing means activates the heating element at a temperature below 40 degrees F.

Preferably, the temperature sensor is activated upon oscillation of the wiper arm.

Objects, features and advantages of this invention are to provide highly satisfactory wiping performance in frigid snowy and icy conditions, a direct, effective, efficient and flexible heating element for a windshield wiper blade to enhance its flexibility and improve the wiping action of the blade; to provide a flexible hinge section to further enhance the wiping action and flexibility required to effectively conform to the compound curvature of a windshield to effectively wipe it; and to keep the frame and linkages free of ice and snow with little or no heating.

BRIEF DESCRIPTION OF THE DRAWINGS

FIG. 1 is a fragmentary perspective view of an automobile with windshield wipers embodying this invention.

FIG. 2 is a perspective view of the windshield wiper blade of FIG. 1.

FIG. 3 is a sectional view of the wiper blade taken generally along line of FIG. 3.

DESCRIPTION OF THE PREFERRED EMBODIMENTS

FIGS. 1 and 2 illustrate a windshield wiper assembly 10 embodying this invention mounted on an automobile (not shown) for wiping its front windshield. The assembly 10 has a wiper blade 12 received in a flexible retainer 20 which forms a replaceable unit 18. The unit 18 is carried by a pair of spaced apart bows 19 each connected to a yoke 11. The yoke 11 is pivotally connected to the extension 13 of the wiper arm 14 that connects with the oscillating motor 22 of the automobile. The wiper blade 12 is slidably received in the retainer 20 which is releasably connected to the bows 19.

Each wiper blade 12 has an elongated flexible body of a rubber-like material, such as neoprene. The blade 12 has a longitudinally extending channel throughout the central portion of its body in which a heating element 21 such as a wire or flexible bar 21 is held. Attached to the heating element 21 is a pin 17 that is releaseably connected to a connector 16' which is joined to an electrical wire 16 that is attached to the wiper arm 14. The wire 16 is connected through a thermo-sensor 15 mounted in the arm 14 to a wire 17 which leads to the power source of the wiper motor.

As shown in FIG. 3, the blade 12 is constructed similar to standard blades which have projecting rib portions to limit the rocking movement of the blade 12 during oscillation.

The heating element 21 can be a Nichrome wire or rod about ⅛ inch in diameter having an electrical resistance of about 0.1 to 0.2 ohms per linear inch. A heating range of about 80° F. to 110° F. is suitable for most driving conditions.

The thermo-sensor 15 can be a thermostat which is activated at a temperature below 40° F. preferably within the range of 32–40° F. The thermo-sensor 15 is located on the underside of the wiper arm 14.

The vehicle's wiper motor will power the heating unit so that the heating will only take place during a need for wiping the window and further upon activation of the thermo-sensor 15 at the selected temperature. When energized, preferably on the vehicle dash panel a light is also activated to show that the heating element is operating.

What is claimed is:

1. A heated windshield wiper assembly, for an oscillating wiper assembly, for a single switch activated oscillating wiper arm operatively connected to a wiper motor and having at least one wiper blade carrier arm, said heated wiper blade assembly comprising:

a windshield wiper blade member having a blade portion and a carrier arm flange portion adapted for mounting on said wiper blade carrier arm;

said blade portion having a longitudinally extending channel having a heating element extending there through to provide heating to said blade member for melting accumulating snow and ice;

temperature sensing means mounted on said wiper blade carrier arm operatively connected to said heating element and to a wire for supplying electrical energy to said motor for oscillating said wiper arm, said temperature sensing means being activated only at a temperature range of 32° F. to 40° F. and upon activating said motor, and deactivated at a temperature above 40° F., whereby the heating element is activated only with temperature and upon oscillation of said wiper blade arm upon activation by a single switch.

2. The heated windshield wiper arm assembly of claim 1 wherein said heating element has an electrical resistance of about 0.1 to 0.2 ohms per linear inch.

3. The heated windshield wiper arm assembly of claim 1 wherein said carrier arm flange portion is detachably mounted to said wiper blade carrier arm.

4. The heated windshield wiper arm assembly of claim 1 wherein said heating element is electrically connected to said temperature sensor means by a removable connector and electrical wires.

5. The heated windshield wiper arm assembly of claim 1 wherein said temperature sensing means comprises a thermostat.

* * * * *